(12) United States Patent
Swank

(10) Patent No.: US 7,775,561 B2
(45) Date of Patent: Aug. 17, 2010

(54) EXHAUST PIPE JOINT WITH INSERT

(75) Inventor: Scott R. Swank, Williamsport, IN (US)

(73) Assignee: Tru-Flex Metal Hose Corp., West Lebanon, IN (US)

( * ) Notice: Subject to any disclaimer, the term of this patent is extended or adjusted under 35 U.S.C. 154(b) by 625 days.

(21) Appl. No.: 11/345,458

(22) Filed: Feb. 1, 2006

(65) Prior Publication Data

US 2007/0176416 A1   Aug. 2, 2007

(51) Int. Cl.
*F16L 17/00* (2006.01)

(52) U.S. Cl. .................. 285/337; 285/236; 285/252; 285/903; 285/917

(58) Field of Classification Search .................. 285/226, 285/235–236, 252, 369–370, 397, 903, 49, 285/337, 917
See application file for complete search history.

(56) References Cited

U.S. PATENT DOCUMENTS

| | | | |
|---|---|---|---|
| 3,306,634 A * | 2/1967 | Groves et al. .................. 285/7 |
| 4,312,526 A | 1/1982 | Cassel | |
| 4,629,226 A | 12/1986 | Cassel et al. | |
| 5,494,319 A | 2/1996 | Thomas | |
| 5,588,680 A | 12/1996 | Cassel et al. | |
| 5,769,463 A | 6/1998 | Thomas | |
| 5,845,946 A | 12/1998 | Thomas | |
| 5,857,716 A | 1/1999 | Thomas | |
| 5,882,046 A | 3/1999 | Thomas | |
| 5,924,282 A | 7/1999 | Thomas | |
| 6,089,624 A | 7/2000 | Cassel et al. | |
| 6,102,446 A | 8/2000 | Thomas | |
| 6,269,524 B1 | 8/2001 | Cassel | |
| 6,312,021 B1 | 11/2001 | Thomas | |
| 6,341,805 B1 * | 1/2002 | Thomas ...................... 285/229 |
| 7,066,495 B2 | 6/2006 | Thomas | |
| 7,267,373 B2 * | 9/2007 | Sakazaki et al. ............ 285/253 |
| 2003/0047942 A1 * | 3/2003 | Yasuda et al. ............... 285/252 |

* cited by examiner

*Primary Examiner*—Aaron M Dunwoody
*Assistant Examiner*—Fannie Kee
(74) *Attorney, Agent, or Firm*—Husch Blackwell Sanders LLP

(57) ABSTRACT

A connection assembly for pipes is provided. The assembly includes a pipe, a corrugated conduit, a circumferentially contractible seal positioned between portions of the conduit and the pipe, a clamp encircling the conduit, seal and pipe, and a plurality of discrete projections on the inside of the seal to limit the extent of overlap between the pipe and the conduit. The seal is circumferentially contractible to secure the conduit and the pipe together with the seal serving to effect a gas-tight seal while filling the annular gap between the conduit and pipe.

3 Claims, 4 Drawing Sheets

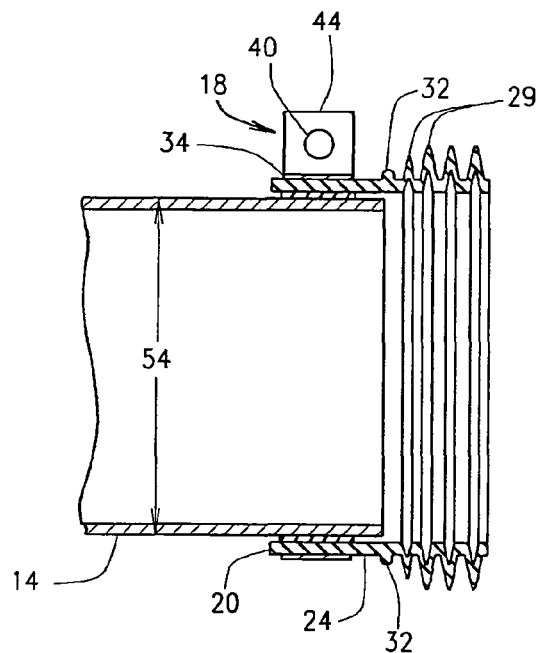
F I G . 3
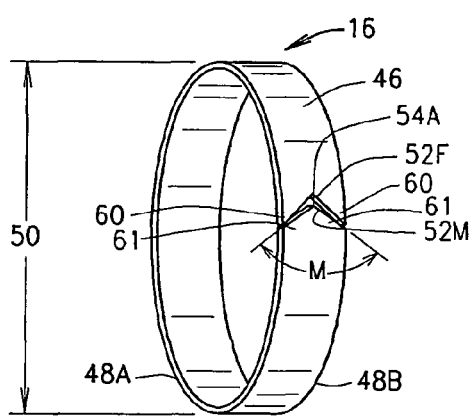
F I G . 4
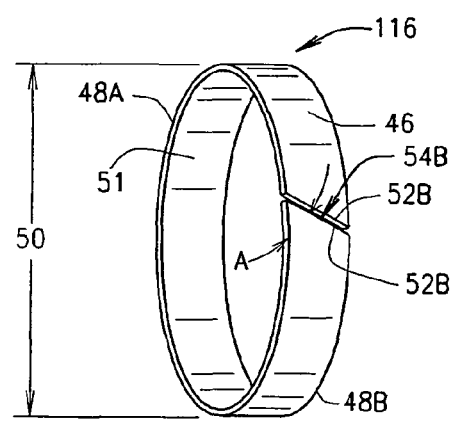
F I G . 5
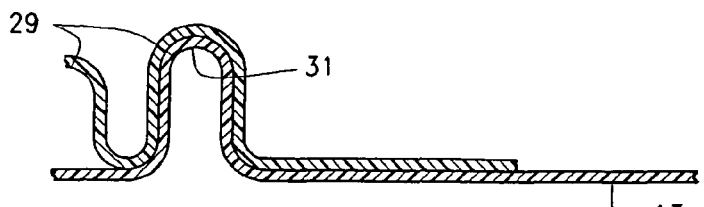
F I G . 6

EXHAUST PIPE JOINT WITH INSERT

BACKGROUND OF THE INVENTION

The present invention generally relates to the field of pipe assemblies such as those used in vehicular exhaust systems and more particularly to an assembly having corrugated conduits that are clamped onto rigid piping and utilize a metal seal element to provide a fluid-tight connection therebetween. The present invention further provides a system that minimizes possible damage to the corrugations of the conduit.

Conduit and piping systems for conveying fluids and bulk materials are used in a wide variety of applications. Various components for such systems have been devised to accommodate different fluids and materials and to operate in particular environments. For example, some of the components of such systems are fabricated from flexible metal hose, which offers the advantages of durability, flexibility, relatively low cost and adaptability to various sizes, configurations and materials.

Flexible metal hose has been used for many years to interconnect components which move relative to each other. Some of the common configurations of flexible metal hose include spiral-wound, edge-interlocked hose wherein the edges of a strip of sheet metal are interlocked on a hose winding machine to permit limited deflection of the resulting flexible metal hose.

Corrugated flexible metal hose is another type of hose that can be used. The corrugations provide flexibility and permit a corrugated pipe or hose section to be bent and shaped more easily than a comparable hose section with smooth walls. Moreover, corrugations can dissipate dynamic stresses associated with the vibration of the components to which the flexible hose section is attached.

Corrugated flexible hose sections can have corrugations of different diameters, such as bellows-type arrangement with the largest-diameter corrugations in the center and corrugations of decreasing diameters toward the ends whereby maximum flexibility is achieved in the center with increasing stiffness toward the ends (see U.S. Pat. No. 5,769,463 to Thomas). Such bellows-type configurations tend to be relatively efficient at dissipating vibrational energy toward their centers.

Hybrid flexible metal hose sections have also been fabricated from corrugated sheet metal bands which are spiral wound with their edges interlocked. The resulting hose sections can provide the advantages of both interlocked-edge and corrugated types of flexible metal hose types. For example, see Thomas U.S. Pat. No. 5,494,319.

Exhaust systems for internal combustion engines are examples of relatively severe environments in which the operating characteristics of flexible metal hoses can be used to advantage. Flexible metal hose sections are often used for connecting exhaust pipes from vehicle internal combustion engines with manifold mufflers, tail pipes and other exhaust system components. Flexible metal hose sections are commonly used in exhaust systems of tractors of tractor-trailer truck rigs and off road and construction vehicles because of their flexibility, temperature resistance and corrosion resistance when fabricated from suitable materials, such as stainless steel, galvanized steel or other metals.

Exhaust systems in general and vehicle exhaust systems in particular must perform reliably under relatively severe operating conditions, which can include temperature extremes, corrosive environmental factors and dynamic stress loading. Dynamic stresses in an exhaust system can originate from vibrations associated with the engine and movement of the vehicle. Such dynamic stresses include axial, lateral and angular forces, all of which can normally be effectively attenuated and controlled by flexible metal hose with corrugations and/or edge interlocking. However, torsional forces caused by the differential rotation of the exhaust system components connected by a flexible metal hose section can inflict significant damage, particularly when the flexible hose section ends are fixedly secured and the flexible section design is rigid with respect to rotational forces. Such dynamic torsional forces can lead to premature metal fatigue, cracking and failure of exhaust system components, including previous designs of flexible metal hose.

Pending U.S. patent application Ser. No. 10/718,785 filed by Thomas on Nov. 21, 2003 and published on May 27, 2004 discloses a system that effectively addresses the problem of dynamic torsional forces. Mating corrugations on corrugated conduits interfit so that the conduits can rotate relative to one another while maintaining a seal. While this system has worked well, it is not wholly without problems.

Notably, the corrugated pipe has an inside diameter greater than the outside diameter of the upstream pipe to which it is connected. A pipe clamp can be tightened on this joint to connect the piping components. However, the corrugated pipe is crushed and crumpled in the process because of its initially loose fit, thus leading to leakage at this joint. This is a serious problem and even more serious in the case of a system of the type shown in the pending Thomas application because crushing of the corrugated pipe can result in deformation extending to the corrugations. If that happens, the corrugations can be damaged to the point where relative rotation of the corrugated pipes is impeded or prevented altogether, thus resulting in failure of the system.

Another problem is that the clamp can slide on the pipe and possibly bang into and damage the corrugations as the clamp is being applied. This damage can lead to the same unacceptable result.

SUMMARY OF THE INVENTION

In the practice of the present invention, a metal conduit assembly is provided which includes a corrugated conduit section, at least one mating pipe, a clamp, and a seal element. The clamp incorporates a constriction means to releasably join the corrugated conduit, seal and mating pipe in a clamped relationship. The seal may be a split band having adjacent free ends or a band having slots arranged in a stair-step pattern. The ends of a split band seal are drawn together when the seal is constricted by the clamping action. The corrugated conduit may include a smooth neck portion with outwardly extending nodules or clamp stops to limit the axial movement of the clamp along the corrugated conduit. This prevents the clamp from engaging and possibly damaging the corrugations.

Other embodiments can be constructed to exhibit additional improved characteristics.

The seal can have one or more internal dimples to limit insertion of the exhaust pipe to a point where it cannot damage the corrugations. The corrugated or strip-wound pipe can be provided with a flared sleeve having an end extension which extends into the pipe to transfer vibrational forces away from the weld joint connecting the sleeve to the corrugated or strip-wound pipe.

The transition flare of the sleeve can serve as a stop to limit insertion of the other pipe to a point short of the corrugations. A flared sleeve can also be applied over the end of the corrugated or strip-wound pipe with the flare allowing variable insertion depths.

Other features and advantages of the invention will become apparent to those skilled in the art upon review of the following detailed description and drawings.

BRIEF DESCRIPTION OF SEVERAL VIEWS OF THE DRAWINGS

The present invention is further described with reference to the accompanying drawings, which show various constructions and implementations of the present invention. However, it should be noted that the invention as disclosed in the accompanying drawings is for illustrative purposes only. The various elements and combinations of elements described below and illustrated in the drawings can be arranged and organized differently to result in constructions which are still within the spirit and scope of the present invention. The accompanying drawings form a part of the specification and are to be read in conjunction therewith, and like reference numerals are used to indicate like parts in the various views:

FIG. 3 is a sectional view of the pipe assembly shown in FIG. 1, illustrating the arrangement of the components;

FIG. 4 is a perspective view of a first embodiment of a seal constructed in accordance with the present invention, wherein the seal has substantially V-shaped ends;

FIG. 5 is a perspective view of a second embodiment of a seal, with the seal in this embodiment having angled beveled ends;

FIG. 6 is an enlarged sectional view of the detail identified by numeral 6 in FIG. 1.

DETAILED DESCRIPTION OF THE INVENTION

Detailed embodiments of the present invention are described herein with reference to the Figures. The specific structural and functional details disclosed herein are intended to be exemplary and should not be interpreted as limiting the invention.

Figure 1:
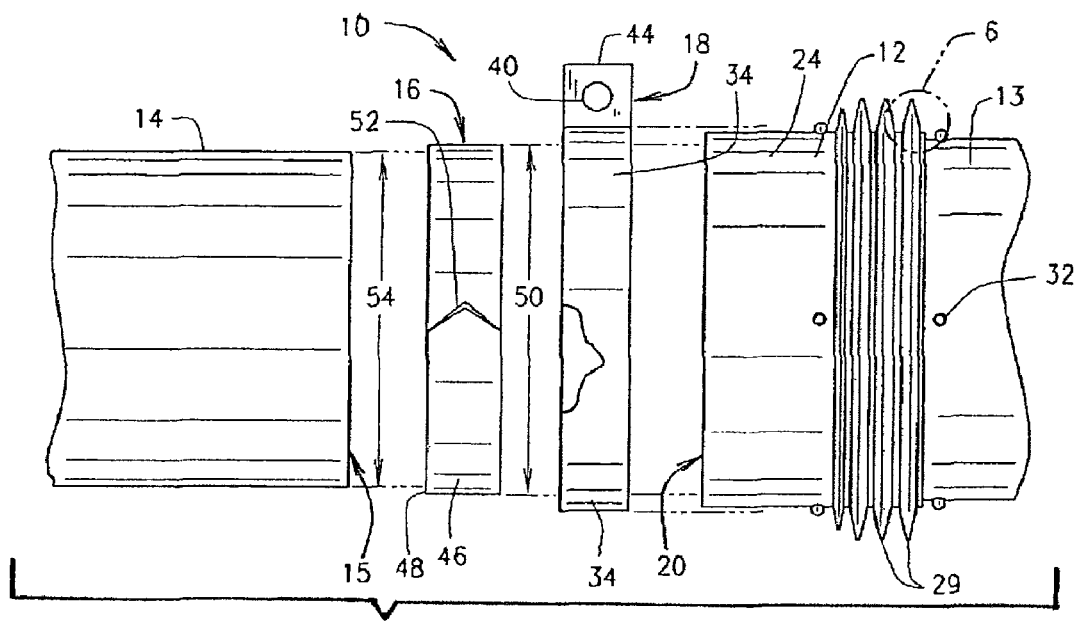
FIG. 1 is an exploded elevational view of a pipe assembly constructed according to one embodiment of the present invention.

Referring to the drawings in detail, and initially to FIG. 1, the reference number 10 generally designates a pipe assembly constructed in accordance with one embodiment of coupling the present invention. The assembly 10 comprises a pair of corrugated conduits 12 and 13, a pipe 14, seal element 16, and a clamp 18, each having a generally circular transverse cross-sectional configuration.

The conduit 12 has a free end 20 and a series of corrugations 29 spaced from end 20. The conduit 12 further comprises a bore 22 to accommodate flow of fluid or gases, e.g., vehicular exhaust gases. Located adjacent to the end 20 is a smooth-walled neck portion 24 of conduit 12.

Figure 2:
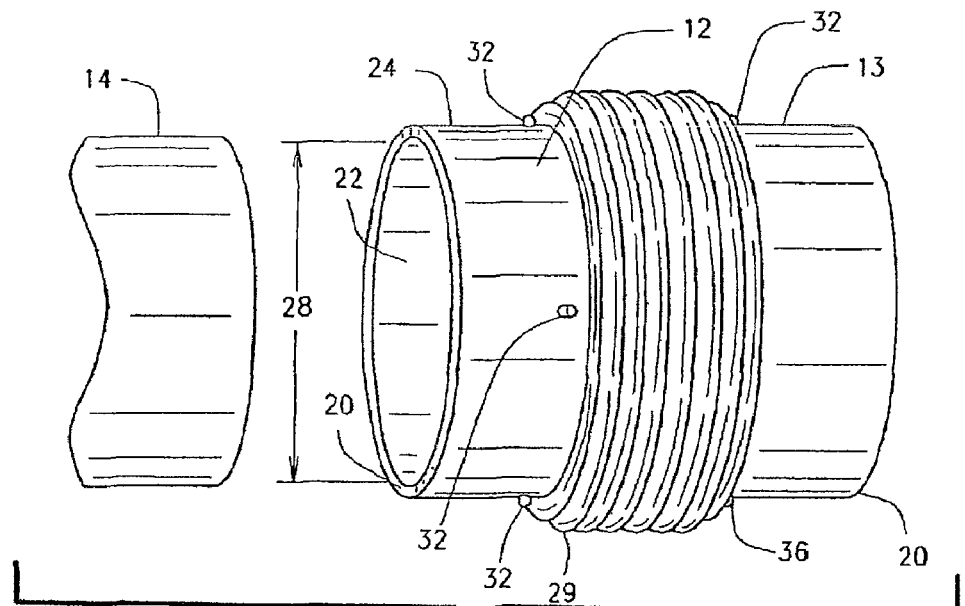
FIG. 2 is an exploded perspective view of the pipe and corrugated conduit shown in FIG. 1.

The conduit 12 has a generally circular transverse cross-sectional configuration, with the neck extension portion 24 having a smooth and generally cylindrical surface between end 20 and the corrugations 29. The neck extension 24 has an inside diameter identified by numeral 28 in FIG. 2. The neck extension 24 provides a region for clamping conduit 12 onto pipe 14.

The pipe 14 is cylindrical and has an outside diameter 54 at an open end 15 of the pipe.

The pipe 14 is adapted to be received within the open end 20 of the conduit 12. In the illustrated embodiment, the outside diameter 54 of pipe 14 is smaller than the inside diameter 28 of conduit 12. Thus, there is a small gap between the outside of pipe 14 and the inside of conduit 12, as is the case when industry standard pipes are used.

The second corrugated conduit 13 is connected with the conduit 12 by means of interfitting corrugations that provide a mechanical connection while allowing relative rotation between the conduits 12 and 13. As best shown in FIG. 6, conduit 13 has one or more corrugations 31 that fit closely inside of the corrugations 29 of conduit 12 in a manner described more fully in pending application Ser. No. 10/718,785 filed by Thomas on Nov. 21, 2003 and published on May 27, 2004. The interfitting corrugations 29 and 31 can rotate relative to one another to accommodate dynamic torsion forces that may be applied to the pipe assembly 10 in service. In order to maintain the integrity of this torsional joint, it is important that the corrugations not be deformed.

The seal 16 may take the form of a cylindrical band 46 having circular edges 48A, 48B (see FIGS. 4 and 5). The seal 16 has a generally circular transverse cross-sectional or ring configuration with an outside diameter 50. The seal 16 is adapted to fit on the pipe 14 and be received within the neck 24.

As shown in FIG. 4, the seal element 16 may take the form of a split collar having free ends 52F and 52M that oppose one another. Ends 52F and 52M are V-shaped, with end 52M having a male V-shape and end 52F having a female V-shape generally matching end 52M. A gap or slot 54A is formed between ends 52F and 52M when the seal 16 is undeformed. The seal 16 may be constructed of a suitable metal able to withstand hot exhaust gases.

The included angle M identified in FIG. 4 for the V angle of the male end 52M may be approximately 100°, although various angles are possible. The gap 54A may be more pronounced near the center where the vertices of the V-shapes are located than at the ends of the legs of the V-shapes. This allows the legs of the V-shape on the female end 52F to spring outwardly and the vertices of the V-shapes to close on one another when the seal element 16 is compressed.

FIG. 5 shows an alternative embodiment of a seal element generally identified by numeral 116. The seal element 116 may be constructed in the same manner as seal element 16 except that element 116 has free ends 52B that are straight edges spaced apart and parallel to one another to present a uniform gap or slot 54B between them when the seal 116 is undeformed. The ends 52B are angled relative to a plane extending transversely through the seal element. This angle is identified as angle A in FIG. 5 and may be approximately 30-35°, although other angles are possible.

The connection between conduit 12 and pipe 14 is implemented by the clamp 18. FIG. 3 illustrates an exemplary assembly of components in the present invention, including the placement and juxtaposition of components. The body of clamp 18 is an annular band 34. A pair of ears 44 are preferably integral with and extend from the band 34 and are each provided with an aperture 40 for receiving a suitable mechanical fastener such as a bolt and nut (not shown) which may be tightened to draw the ears 44 together and thus clamp neck 24 around the end portion of pipe 14. The seal element 16 (or 116) is sandwiched between pipe 14 and conduit 12 and is thus compressed when clamp 18 is tightened, thereby forming an effective seal and preventing conduit 12 from being crushed or crinkled significantly.

The seal 16 (or 116) is located within the interior of the neck 24 of the conduit 12. The pipe 14 is received within the seal 16 (or 116). The seal 16 (or 116) thus substantially fills in the area or the gap between the diameters 28 and 54. Thus, a secure and gas-tight connection is formed therebetween, with the clamp providing a secure mechanical connection and the seal element providing an effective seal. When the clamp 18 is tightened, the free ends of the seal element are drawn together as the seal is compressed by the clamping force, without substantial deformation of the conduit 12. The presence of the seal 16 (or 116) provides a secure mechanical connection without crimping, crushing or crinkling of the corrugated conduit 12 in a manner that could deform the corrugations and disable the torsion joint between conduits 12 and 13.

In the embodiment shown in FIG. 4, upon circumferential contraction of the seal 16, the end portions 60 of the female end 52F are expanded outwardly by contact with the end portions 61 of the male end 52M to maintain effective sealing engagement. The seal 116 shown in FIG. 5, utilizes beveled ends 52B that can close and then slide along one another to maintain effective sealing engagement. Small gaps may remain at the ends of the seal element and still provide an effective seal. The use of the seal 16 can accommodate for out of round or out of dimension or tolerance pipes 14 and necks 24.

As previously described, the clamp 18 is located around the neck 24 of the coupler 12. During the positioning of the clamp 18, there is the potential that the clamp may be moved too far inwardly from the end 20 of the neck 24, in the direction of the corrugations 29. Placement of the clamp 18 too far inward on the neck 24 of the coupler 12 may result in the clamp damaging or deforming the corrugations 29 and thus compromising the integrity of the joint. To address this issue, the present invention provides a stop which may take the form of two or more nodular protrusions 32 located on the neck portion 24 of conduit 12. The protrusions 32 are preferably located approximately 180 degrees apart and at a sufficient distance from end 20 of the neck 24 to allow axial adjustment of the clamp 18 along the neck 24 but preventing travel of the clamp 18 against the corrugations 29. The protrusions 32 thus serve as a stop located between the conduit end 20 and the corrugations 29.

The pipe assembly 10 of the present invention may be employed in a variety of applications where it is desirable to have couplings that can be taken apart and put back together with fluid tight seal maintained. In other words, the present invention is advantageous in an environment where a permanently formed coupling such as a welded joint would not provide the needed flexibility for replacement or reassembly of parts. An example of such an environment is a vehicle and in particular, truck, bus or heavy equipment exhaust systems.

Figure 7:
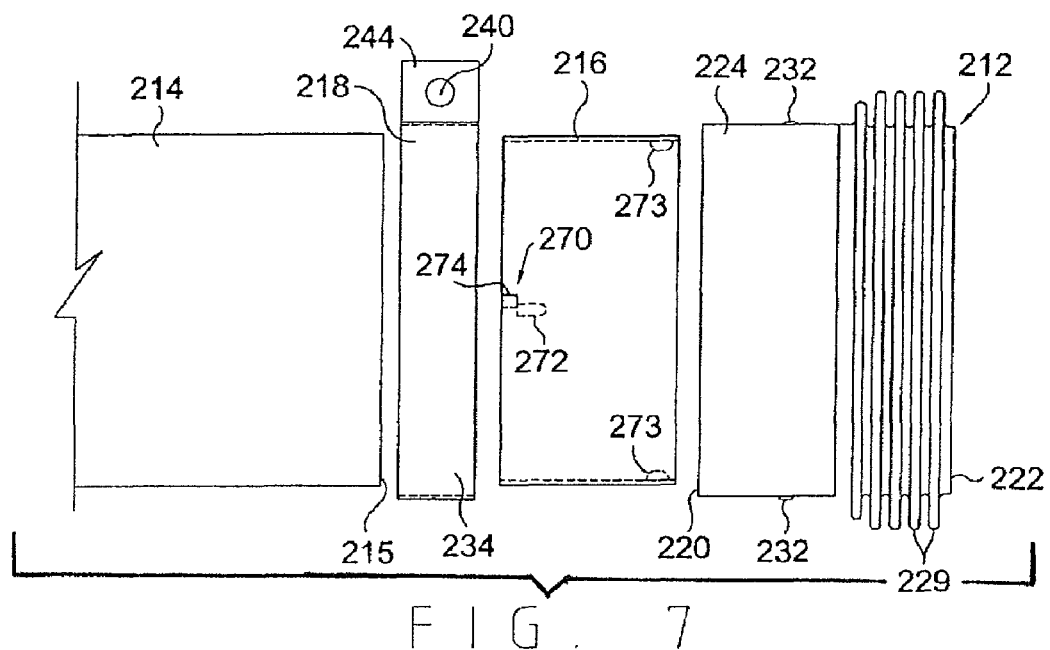
FIG. 7 is an exploded side elevational view of a pipe assembly constructed according to another embodiment of the invention.
Figure 8:
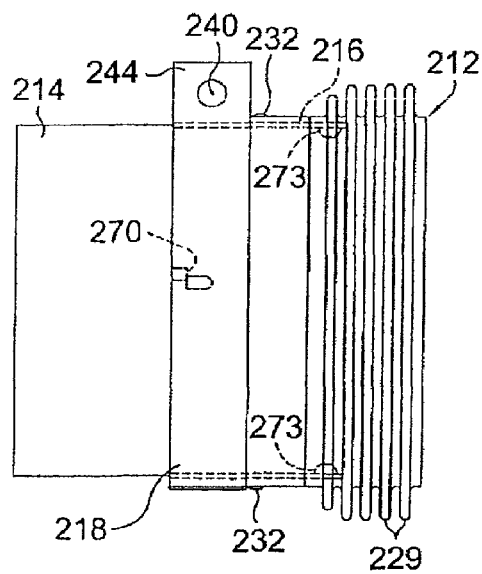
FIG. 8 is a side elevational view of the pipe assembly shown in FIG. 7 in the assembled condition.

FIGS. 7 and 8 depict an alternative embodiment of the invention. This embodiment includes a corrugated conduit 212 having corrugations 229 that may mate with the corrugations of another corrugated pipe (not shown) to provide a rotational joint wherein the corrugations provide for relative rotation between the corrugated pipes. The corrugated pipe 212 has a smooth cylindrical neck 224 having a free end 220. A bore 222 is formed in the conduit 212 to accommodate the flow of exhaust gases or other fluids. One or more beads or protrusions 232 are formed on the outside surface of the neck 224. There are preferably two of the protrusions 232 formed at diametrically opposed locations on the neck 224.

The embodiment of FIGS. 7 and 8 also includes a cylindrical pipe 214 having an outside diameter slightly smaller than the inside diameter of the neck 224. The pipe 214 terminates in a circular end 215.

A seal element 216 may take the form of a cylindrical band having a size to fit closely over pipe 214 and inside of the neck 224. The seal element 216 may be a split band of the type shown in FIG. 4 or FIG. 5, or it may be constructed otherwise to contract circumferentially when subjected to compressive force. By way of example, the seal element 216 may be provided in one of its edges with one or more pairs of stair-step slots generally identified by numeral 270. The slots 270 may be of the type shown in U.S. Pat. No. 4,629,226 to Cassel et al., which is incorporated by reference with respect to the description of the stair-step slots 270. The slots 270 include an inboard slot 272 and an outboard slot 274. The slots 272 and 274 are offset circumferentially and axially on the seal element 216, with corners of the two slots 272 and 274 being adjacent to one another. The seal element 216 is also provided with one or more internal dimples 273. The dimples 273 are located near the edge of seal element 216 away from the slots 270. There are preferably two dimples 273 at diametrically opposed locations on the seal element 216.

A clamp 218 is used to implement the connection between conduit 212 and pipe 214. The body of the clamp 218 may take the form of a split annular band 234 having a pair of ears 244 on opposite sides of the split. Apertures 240 are formed in the ears 244 in alignment with one another to receive a fastener (not shown) that may be used to draw the ears 244 together and thus contract the clamping band 234.

The pipe assembly is shown in FIG. 8 in its assembled condition. The seal element 216 is placed around the pipe 214 adjacent to the end 215. The dimples 273 provide stops that properly locate the seal element 216 on pipe 214 and limit the insertion of the pipe 214 into the seal element and the corrugated conduit 212. The pipe 214 and seal element 216 are then inserted inside of the neck 224 as shown in FIG. 8. The seal element 216 substantially fills the gap formed between the outside diameter of pipe 214 and the inside diameter of the conduit 212. The final step in assembling the pipe assembly involves applying the clamp 218 to the neck 224 of the corrugated conduit and thus around the neck 224, the seal element 216 and the end portion of pipe 214. When the clamp 218 is tightened, the slots 270 allow the seal element 216 to circumferentially contract if necessary. The beads or protrusions 232 limit the movement of the clamp 218 onto neck 224 and thus prevent the clamp from moving far enough to contact and possibly damage the corrugations 229.

Figure 9:
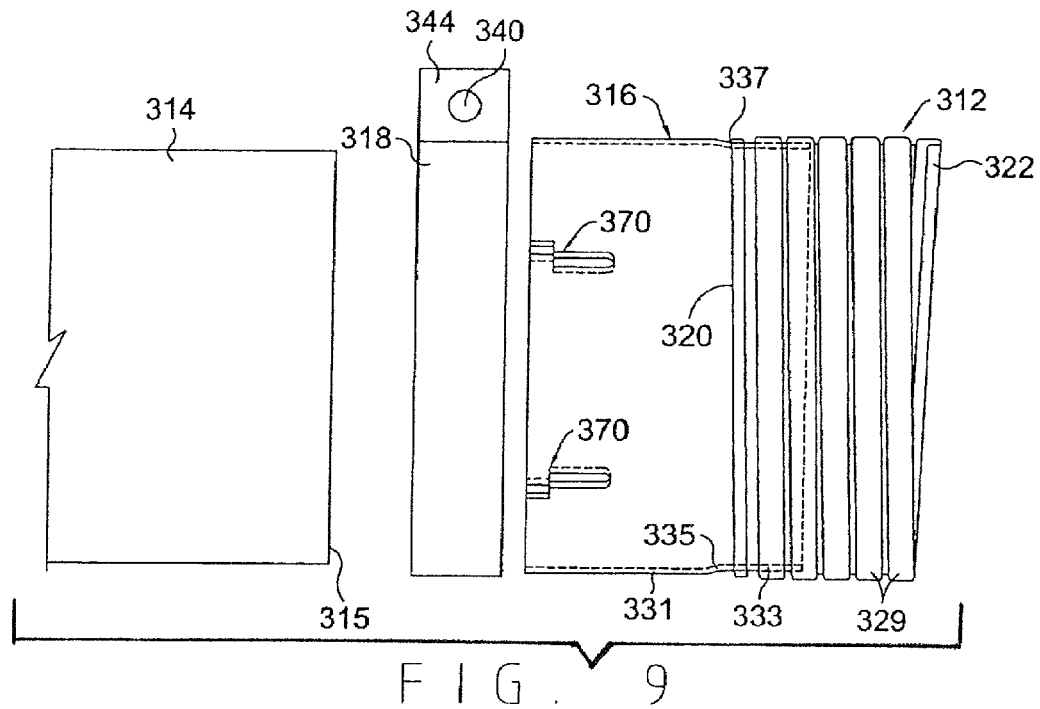
FIG. 9 is a fragmentary side elevational view of the components of a pipe assembly constructed according to still another embodiment of the invention.

FIG. 9 depicts still another embodiment of the invention which includes a spiral wound conduit 312, a pipe 314, a flared sleeve 316, and a clamp 318. The spiral wound conduit 312 has an end 320 and presents an internal bore 322 for accommodating exhaust gases or other fluids. The conduit 312 may be constructed of spirally wound metal strips which interlock at their edges to provide corrugations 329. The sleeve 316 has a cylindrical main body 331, a cylindrical end extension 332 and a tapered transition section 335 which connects the body 331 with the end extension 333. The body 331 has a larger diameter than the end extension 330 such that the transition section 335 tapers from the main body 331 to the end extension 333. The end extension 333 has a diameter to fit closely inside of the corrugated conduit 312 and has a length to extend well into conduit 312 a substantial distance inwardly from the end 320. The edge of the body 331 opposite the end extension 333 may be provided with one or more pairs of stair-step slots 370 which may be constructed similarly to slots 270. A circular weld 337 is formed exteriorly around the end 320 of conduit 312 and the transition section 335 of sleeve 316 to provide a welded connection of sleeve 316 to conduit 312.

The pipe 314 may be a smooth cylindrical pipe that terminates in a circular end 315. The outside diameter of pipe 314 is preferably equal to or slightly less than the inside diameter of the main body 331 of sleeve 316. Consequently, the end portion of pipe 314 can be inserted into the main body 331. The insertion of pipe 314 is limited by engagement of its end 315 with the tapered transition section 335 of sleeve 316.

The clamp 318 may be constructed in the same manner as clamps 18 and 218. Ears 344 may be drawn together to tighten the clamp 318 upon tightening of a suitable fastener (not shown) inserted through aligned apertures 340 in the ears 344.

The embodiment of FIG. 9 is assembled by placing the clamp 318 around sleeve 316 and inserting pipe 314 into sleeve 316 until end 315 is engaged with the stop provided by the transition section 335. The clamp 318 can then be tightened to secure the conduit 312 and pipe 314 together. The presence of the slots 370 allows the body 331 of sleeve 316 to contract under the compression force applied by the clamp 318 to provide a secure and leak proof joint between conduit 312 and pipe 314.

Because the end extension 333 extends well into the conduit 312, vibration is transferred away from the weld 337. Accordingly, the heat affected weld is protected from vibrations that could adversely effect the integrity of the weld.

Figure 10:
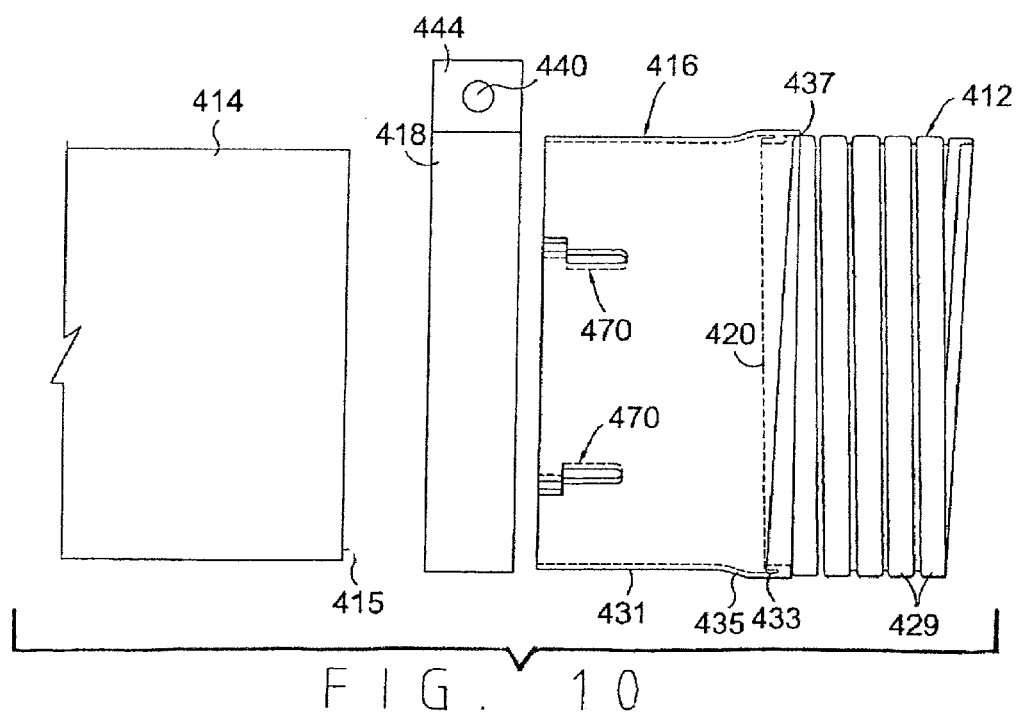
FIG. 10 is a fragmentary side elevational view of the components of a pipe assembly constructed according to yet another embodiment of the invention.

FIG. 10 depicts yet another embodiment of the invention which includes a corrugated or strip wound flexible conduit 412, a pipe 414, a sleeve 416 and a clamp 418. The conduit 412 includes spirally wound strips having interlocked edges to present corrugations 429. An edge 420 is formed on the end of the conduit 412.

The sleeve 416 has a flared configuration and includes a cylindrical main body 431, an enlarged cylindrical end 433, and a tapered transition section 435. The enlarged end section 433 is larger in diameter than the main body 431 such that the transition section 435 tapers from the end section 433 to the main body 431. The enlarged end 433 has a diameter to fit closely around the end portion of conduit 412 and may be connected to the corrugated conduit by a circular weld 437 extending around the edge of the enlarged end 433 and around conduit 412. A pair of stair-step slots 470 may be formed in the end portion of the main body 431 opposite the end section 433.

The pipe 414 may be a smooth cylindrical pipe terminating in a circular edge 415. The outside diameter of pipe 414 is preferably equal to or slightly smaller than the inside diameter of the main body 431 of sleeve 416. Accordingly, pipe 414 can be inserted into the main body 431. The clamp 418 is constructed in the same manner as clamp 318 and is provided with a pair of ears 444 having aligned apertures 440. A fastener such as a bolt (not shown) may be extended through the apertures 440 and a nut may be tightened on the bolt to draw the ears 444 together, thus tightening the clamp 418 onto sleeve 416. The slots 470 accommodate circumferential contraction of the main body 431 of sleeve 416 to assure a secure mechanical connection as well as a leak proof joint between the conduit 412 and pipe 414.

The provision of an enlarged end 433 and the flared transition section 435 accommodate insertion of conduit 412 to variable depths within the sleeve 416. Conduit 412 may be fully inserted to a point where its end 420 engages the transition section 435 to limit the depth of the insertion, and the weld 437 may then be effected to secure the sleeve 416 to conduit 412. Alternatively, if necessary to accommodate the particular pipe installation, conduit 412 may be inserted only partially into the end section 433 such that the conduit end 420 is spaced from the transition section 435 when the weld 437 is made. Thus, if tolerance conditions or other variations are present, they can be accommodated by varying the insertion depth of conduit 412 into sleeve 416 as permitted by the enlarged end section, with a limit to the insertion depth provided by the transition section 435.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A exhaust pipe assembly for vehicular exhaust, comprising:
   a metallic pipe;
   a metallic corrugated conduit having a neck interfitting with said pipe at a joint;
   a metallic circumferentially contractable seal element at said joint positioned between said pipe and said conduit;
   a metallic clamp applicable to said joint in a manner to connect said pipe and said conduit while compressing said seal element therebetween to effect a seal at said joint; and
   a plurality of discrete metallic projections on the inside of said seal element limiting the extent of overlap between said pipe and said conduit at said joint.

2. An exhaust pipe assembly as set forth in claim 1, including a fixed protrusion on the outside of said neck engageable with said clamp to limit movement of said clamp toward said corrugations.

3. An exhaust pipe assembly for vehicular exhaust, comprising:
   a metallic pipe;
   a metallic corrugated conduit having a neck interfitting with said pipe at a joint;

a metallic circumferentially contractable seal element at said joint positioned between said pipe and said conduit;

a metallic clamp applicable to said joint in a manner to connect said pipe and said conduit while compressing said seal element therebetween to effect a seal at said joint; and a fixed protrusion on the outside of said neck engageable with said clamp to limit movement of said clamp toward said corrugations.

* * * * *